(12) United States Patent
Neet et al.

(10) Patent No.: US 8,044,549 B2
(45) Date of Patent: Oct. 25, 2011

(54) SPOOL ASSEMBLY FOR AN ELECTRIC MACHINE

(75) Inventors: Kirk Neet, Pendleton, IN (US); Scott Bitzer, Fishers, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 440 days.

(21) Appl. No.: 12/177,237

(22) Filed: Jul. 22, 2008

(65) Prior Publication Data

US 2010/0019607 A1 Jan. 28, 2010

(51) Int. Cl.
*H02K 23/40* (2006.01)
(52) U.S. Cl. ........................................................ 310/194
(58) Field of Classification Search ................... 310/194, 310/195, 263
See application file for complete search history.

(56) References Cited

U.S. PATENT DOCUMENTS

| | | | | |
|---|---|---|---|---|
| 5,539,265 A * | 7/1996 | Harris et al. | ................... | 310/263 |
| 6,777,845 B2 * | 8/2004 | York et al. | ................... | 310/194 |
| 6,888,271 B2 * | 5/2005 | York | ......................... | 310/49.32 |
| 7,038,347 B2 * | 5/2006 | Militello et al. | ............... | 310/194 |
| 2003/0034708 A1 * | 2/2003 | Digby et al. | .................. | 310/194 |

* cited by examiner

*Primary Examiner* — Quyen Leung
*Assistant Examiner* — Leda Pham
(74) *Attorney, Agent, or Firm* — Cantor Colburn LLP

(57) ABSTRACT

An electric machine includes a housing, a stator mounted within the housing, and a rotor including a spool assembly. The spool assembly includes a spool having a main body portion having a first end portion that extends substantially uninterrupted to a second end portion through an intermediate portion. The spool further includes a first plurality of mounting elements provided on the first end portion and a second plurality mounting elements provided on the first end portion. A star member is secured to the first end portion of the spool.

20 Claims, 6 Drawing Sheets ically insulating material such as, but not limited to, plastic. Towards that end, spool 40 includes a main body portion 60 having a first peripheral end portion 62 that extends to a second peripheral end portion 63 through a substantially un-interrupted intermediate portion 65. That is, spool 40 is constructed without thick flanges in order to maximize wire carrying capacity of spool assembly 38. Spool 40 is also shown to include a wire tie off post 67 as well as a first plurality of mounting elements, one of which is indicated at 74, and a second plurality of mounting elements, one of which is indicated at 76, for retaining star member 48. Spool 40 also includes a third plurality of mounting elements, one of which is indicated a 80, and a

SPOOL ASSEMBLY FOR AN ELECTRIC MACHINE

BACKGROUND OF THE INVENTION

Exemplary embodiments of the invention relate to the art of electric machines and, more particularly, to a spool assembly for an electric machine.

Certain electric machines, such as claw-pole alternators, include a rotor formed from a plurality of steel segments, a steel core, magnet wire, and a spool assembly. The spool assembly includes a spool configured to insulate the magnet wire from the steel core, and flaps that are configured to insulate the magnet wire from the steel segments. Prior art spools were formed completely from plastic. The plastic spools were bulky which limited carrying capacity for the magnet wire.

Newer spool assemblies employ a plastic spool, indicated generally at 2 in FIG. 1, and laminate flaps (not shown) formed in a star. The laminate flaps or stars allowed for a spool assembly that was much thinner than the prior art plastic spool assemblies. The thinner design increased carrying capacity for the magnet wire and heat transfer from the spool assembly. While the newer spool assemblies have several advantages over the older completely plastic designs, a disadvantage exists in that the laminate flaps are attached to spool 2 by sonic welding. Not only is sonic welding a difficult and expensive process, sonic welding also requires that spool 2 include thick plastic portions in the form of opposing thick flanges 4 and 5 that provide weld support surfaces, one of which is indicated at 8. The thick plastic portions or thick flanges 4 and 5 defeat the purpose of the new design. That is, by adding thick flanges 4 and 5 to spool 2, magnet wire carrying capacity is reduced.

BRIEF DESCRIPTION OF THE INVENTION

In accordance with an exemplary embodiment of the invention, an electric machine includes a housing, a stator mounted within the housing, and a rotor including a spool assembly. The spool assembly includes a spool having a main body portion. The main body portion includes a first end portion that extends substantially uninterrupted to a second end portion through an intermediate portion. The spool further includes a first plurality of mounting elements provided on the first end portion and a second plurality mounting elements provided on the first end portion. A star member is secured to the first end portion of the spool.

In accordance with another exemplary embodiment, a spool for an electric machine includes a main body portion having a first end portion that extends substantially uninterrupted to a second end portion through an intermediate portion. The spool further includes a plurality of mounting elements provided on the first and end portion.

In accordance with another exemplary embodiment, a star member for an electric machine includes a plurality of flap members that collectively define a central opening, and a plurality of mounting members that extend into the central opening. The plurality of mounting members are adapted to engage with corresponding ones of a plurality of mounting elements provided on a spool to form a spool assembly.

Additional features and advantages are realized through the techniques of exemplary embodiments of the present invention. Other embodiments and aspects of the invention are described in detail herein and are considered a part of the claimed invention. For a better understanding of the invention with advantages and features thereof, refer to the description and to the drawings.

DETAILED DESCRIPTION OF THE INVENTION

Figure 1:
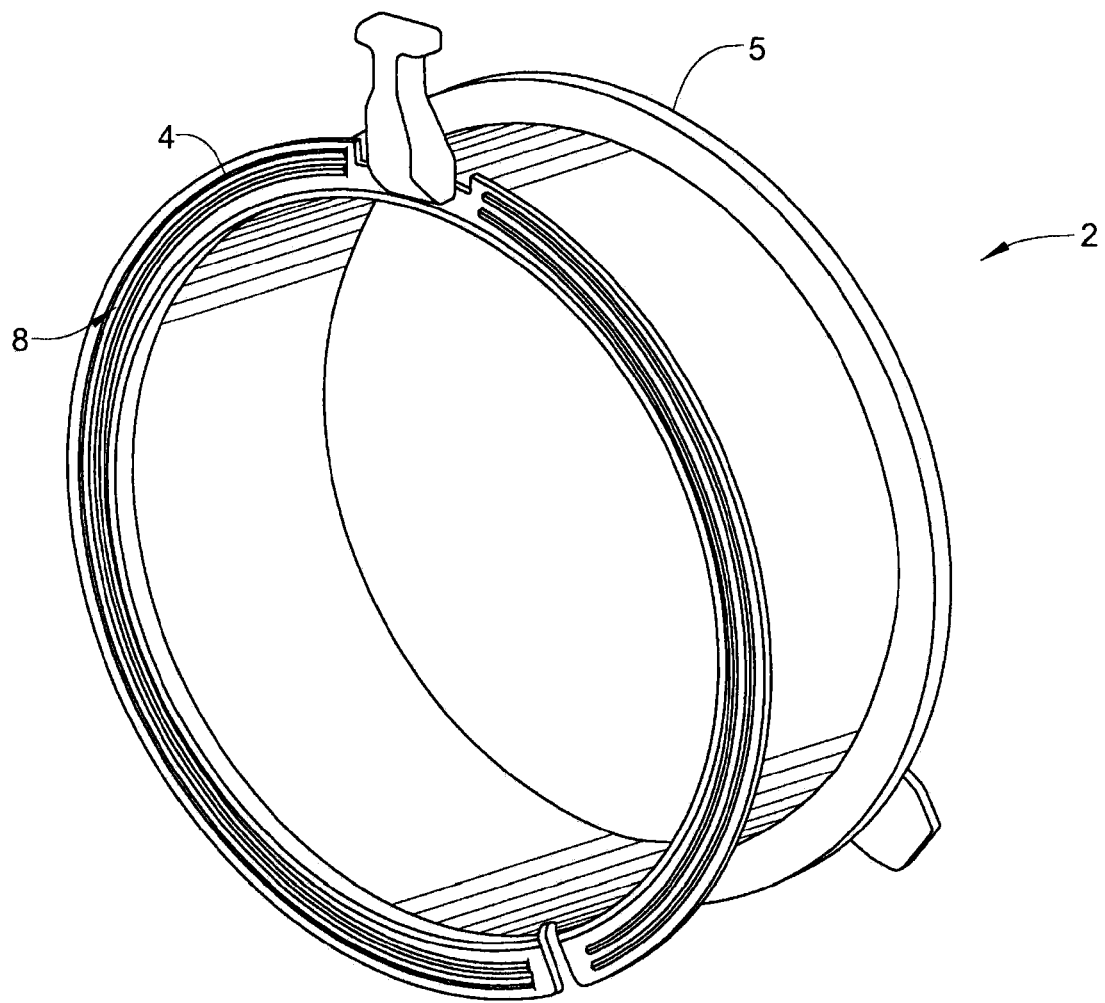
FIG. 1 is a right perspective view of a spool for an electric machine constructed in accordance with the prior art.
Figure 2:
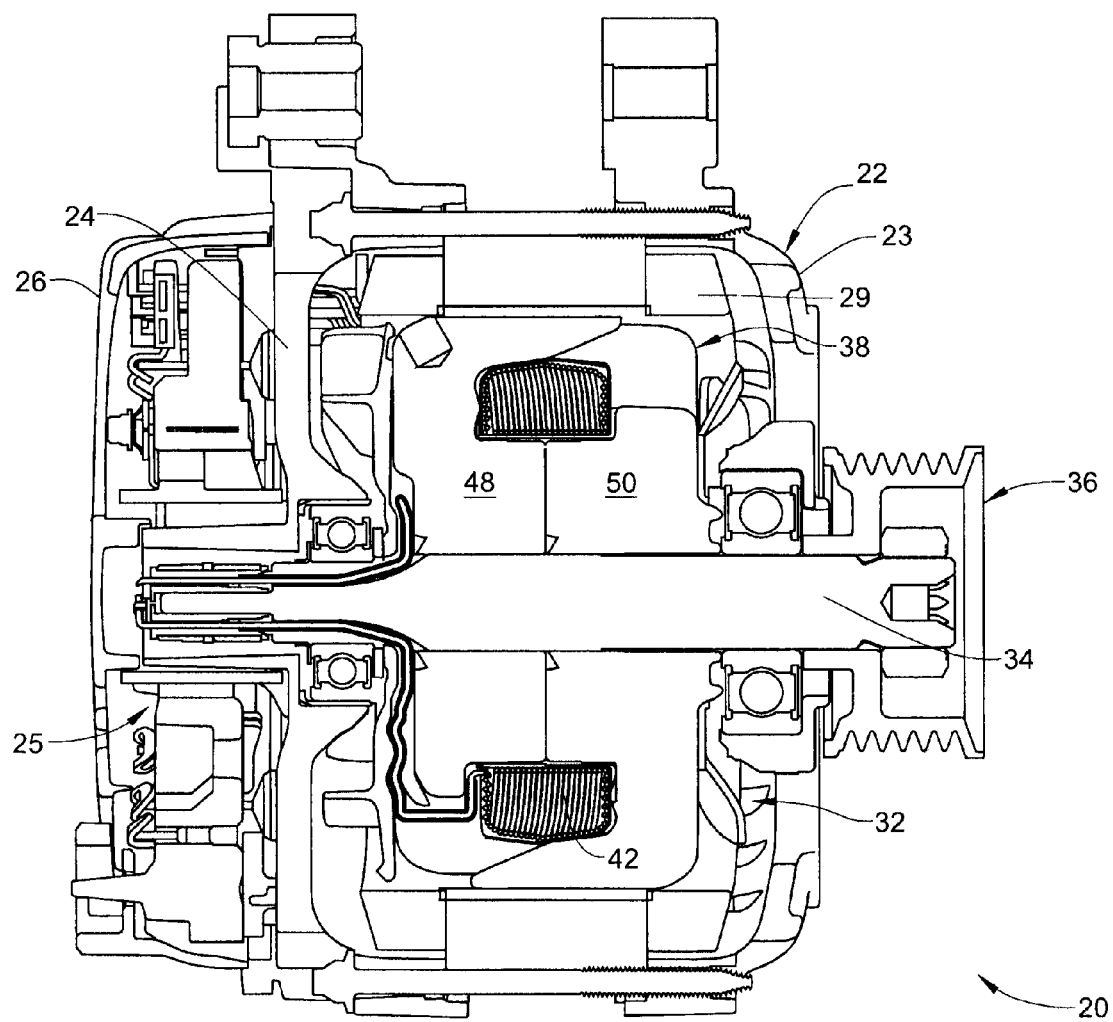
FIG. 2 is a cross-sectional side view of an electric machine including a spool assembly constructed in accordance with an exemplary embodiment of the invention.
Figure 3:
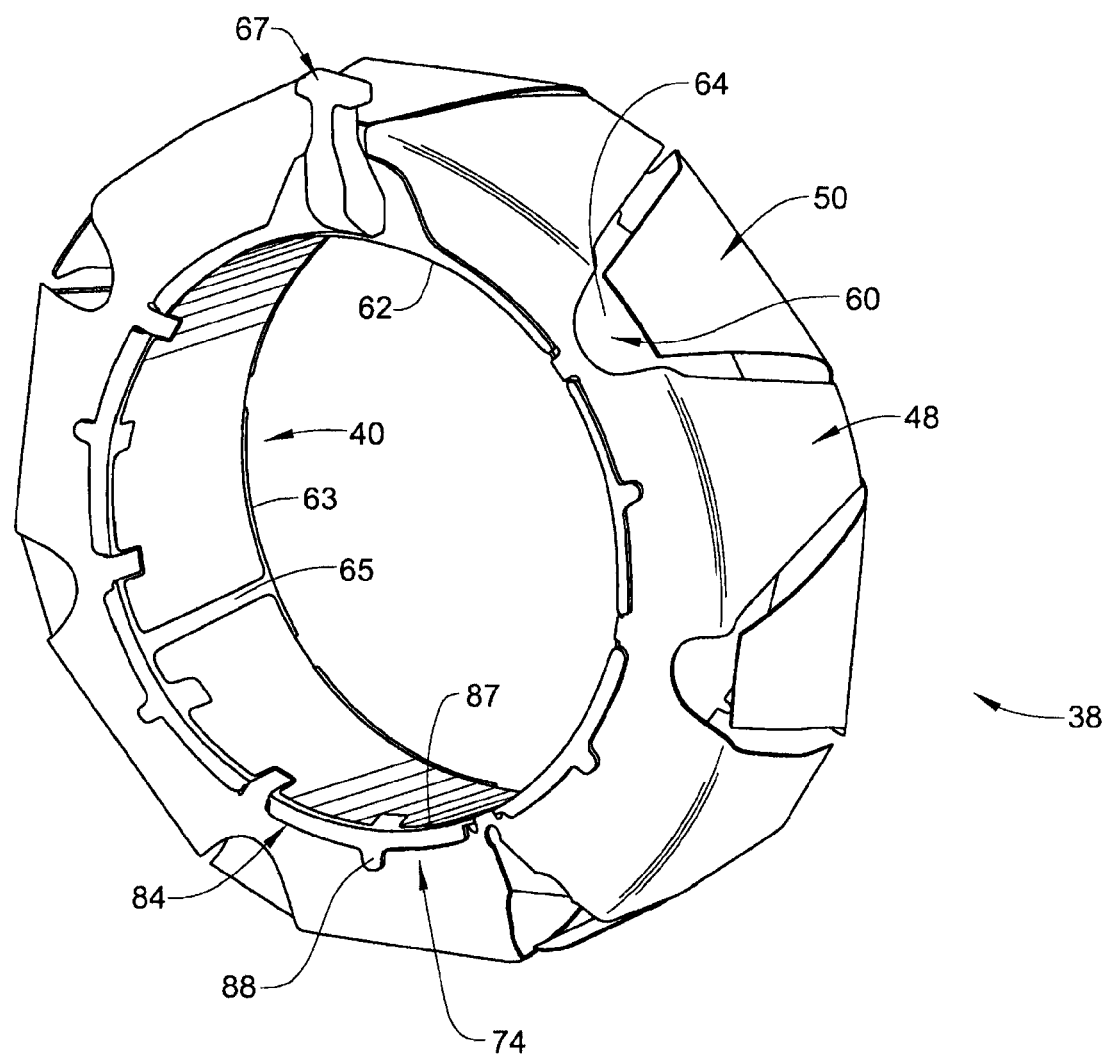
FIG. 3 is a right perspective view of a spool assembly in accordance with an exemplary embodiment of the invention.

With initial reference to FIGS. 2 and 3, an electric machine, shown in the form of an automotive alternator, constructed in accordance with exemplary embodiments of the invention is indicated generally at 20. Electric machine 20 includes a housing 22 having a first surface 23 and a second, opposing surface 24. A plurality of electrical components 25 are mounted to second surface 24 and are provided with a cover 26. In addition, electric machine 20 is shown to include a stator 29 having a plurality of steel segments (not separately labeled) and a rotor 32. Rotor 32 includes a shaft 34 operatively coupled to a pulley 36, and a spool assembly 38. As will be detailed more fully below, spool assembly 38 includes a spool 40 wrapped with wire 42 and protected by first and second star members 48 and 50. In accordance with one aspect of the exemplary embodiment, spool 40 is formed from a non-electrically conducting material, such as nylon, and each star member is formed from a non-conducting sheet of insulation material or laminate. Typically, each star member 48 and 50 is stamped or rolled out of the non-conducting sheet or laminate. In operation, rotor 32 spins within housing 22 adjacent to stator 29. The motion of rotor 32 causes an electrical current to develop in wire 42. The electrical current is passed to electrical components 25 for processing. The processed electrical current is then utilized to power various electrical devices.

Reference will now be made to FIGS. 3-6 in describing spool assembly 38 constructed in accordance with exemplary embodiments of the invention. As shown, star members 48 and 50 are mounted to spool 40 and manipulated (folded) to provide protection for underlying wire (not shown). In accordance with one aspect of the exemplary embodiment, spool 40 is formed from a readily moldable and electrically insulating material such as, but not limited to, plastic. Towards that end, spool 40 includes a main body portion 60 having a first peripheral end portion 62 that extends to a second peripheral end portion 63 through a substantially un-interrupted intermediate portion 65. That is, spool 40 is constructed without thick flanges in order to maximize wire carrying capacity of spool assembly 38. Spool 40 is also shown to include a wire tie off post 67 as well as a first plurality of mounting elements, one of which is indicated at 74, and a second plurality of mounting elements, one of which is indicated at 76, for retaining star member 48. Spool 40 also includes a third plurality of mounting elements, one of which is indicated a 80, and a fourth plurality of mounting elements, one of which is indicated at 82, for retaining star member 50.

Figure 4:
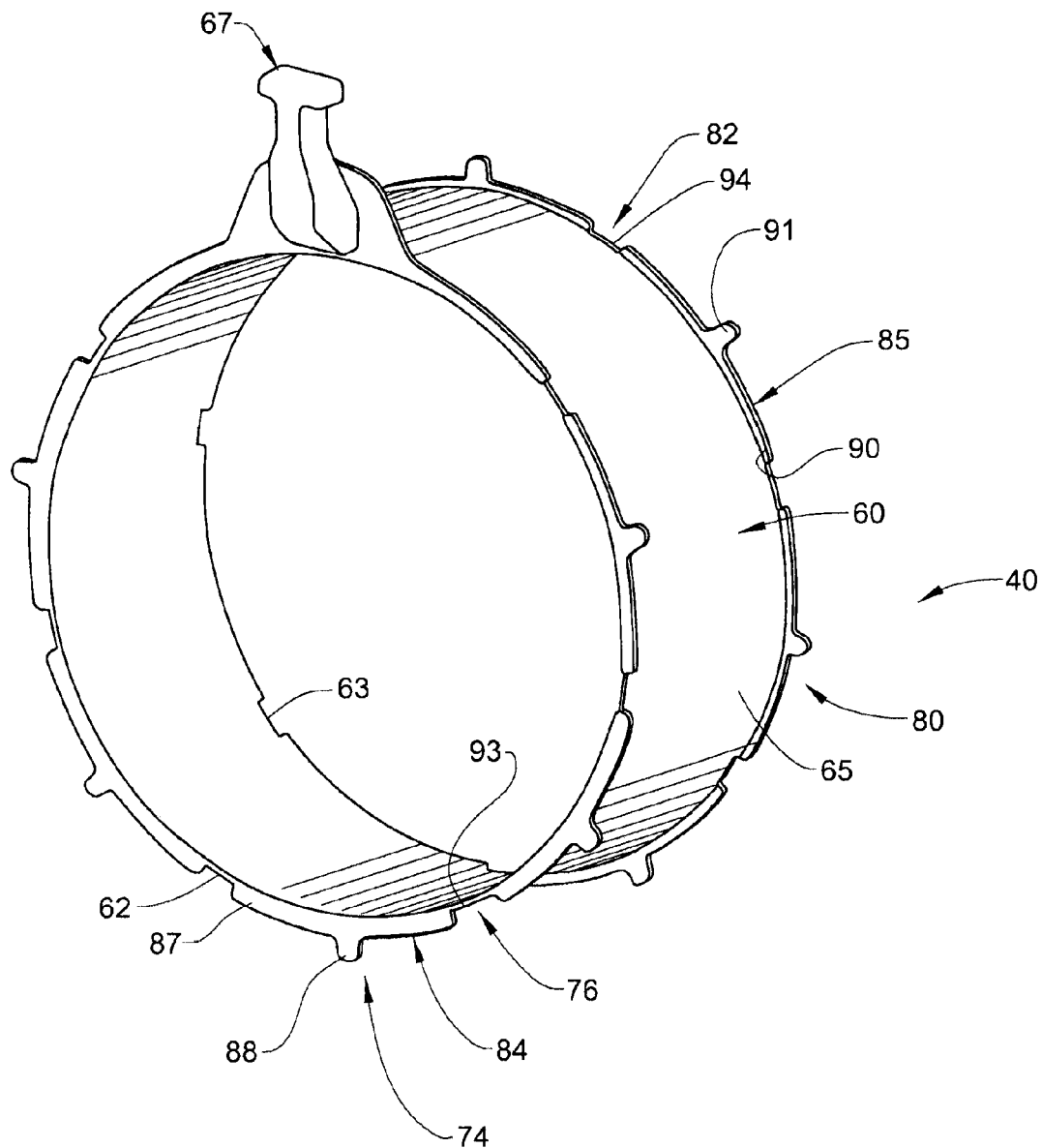
FIG. 4 is a right perspective view of a spool portion of the spool assembly of FIG. 3.

As best shown in FIG. 4, each of the first and third pluralities of mounting elements 74 and 80 take the form of a projection, such as shown at 84 in connection with mounting elements 74, and at 85 in connection with mounting elements 80. Each projection 84 and 85 extends substantially perpendicularly outward from respective ones of first and second end portions 62 and 63 and is arranged in a spaced relationship about main body portion 60. In addition, projection 84 includes an ear element 87 and a tab element 88. Likewise, projection 85 includes an ear element 90 and tab element 91. Also shown in FIG. 4, each of the second and fourth plurality of mounting elements 76 and 82 take the form of slots, such as shown at 93 in connection with second plurality of mounting element 76, and at 94 in connection with fourth plurality of mounting element 82. Each slot 93 and 94 is arranged in a spaced relationship about respective ones of first and second end portions 62 and 63. More specifically, projections 84 and slots 93 are staggered about first end portion 62 while projections 85 and slots 94 are staggered about second end portion 63. By staggered it should be understood that, for example, projection 84 and slot 93 are arranged in an alternating pattern one after the other about a periphery of first end portion 62.

Figure 5:
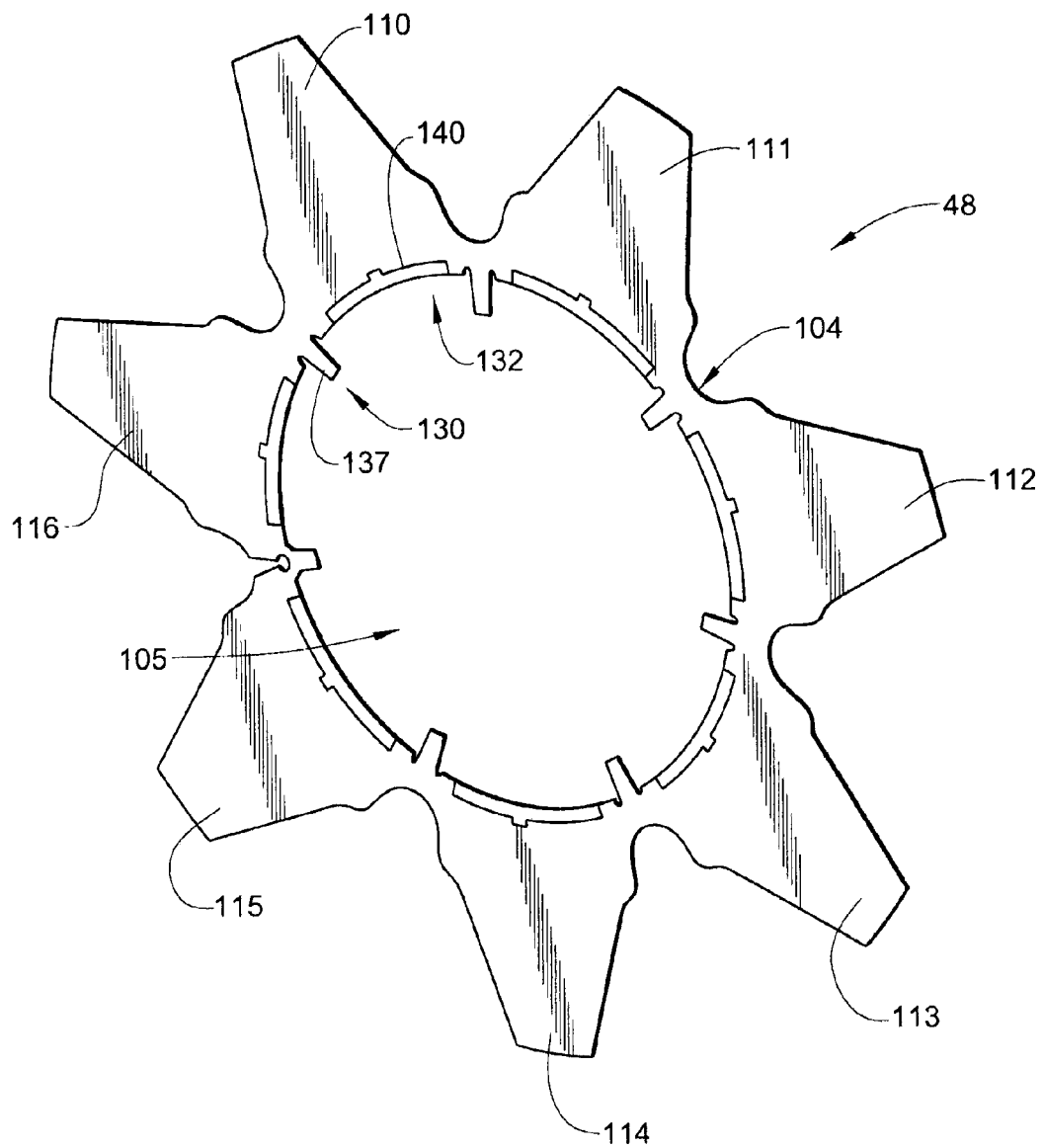
FIG. 5 is a right perspective view of a star member of the spool assembly of FIG. 3.

At this point it should be understood that each star member 48 and 50 is similarly formed such that a detailed description will follow referencing FIG. 5 in describing star member 48 with an understanding that star member 50 includes corresponding structure. As shown, star member 48 is formed from a laminate material such as, but not limited to, a Polyester/Nomex®/Polyester, or Polyimide/Nomex®/Polyimide or the like. Star member 48 includes a main body 104 having a central opening 105. Star member 48 includes a plurality of flap members 110-116 that radiate outward from a central opening 105 and a plurality of mounting members, one of which is indicated at 130, and a plurality of mounting components, one of which is indicated at 132. Each of the plurality of mounting members 130 takes the form of a prong 137 that extends radially into central opening 105 while each of the plurality of mounting components 132 takes the form of a recess 140 formed in main body 104.

Figure 6:
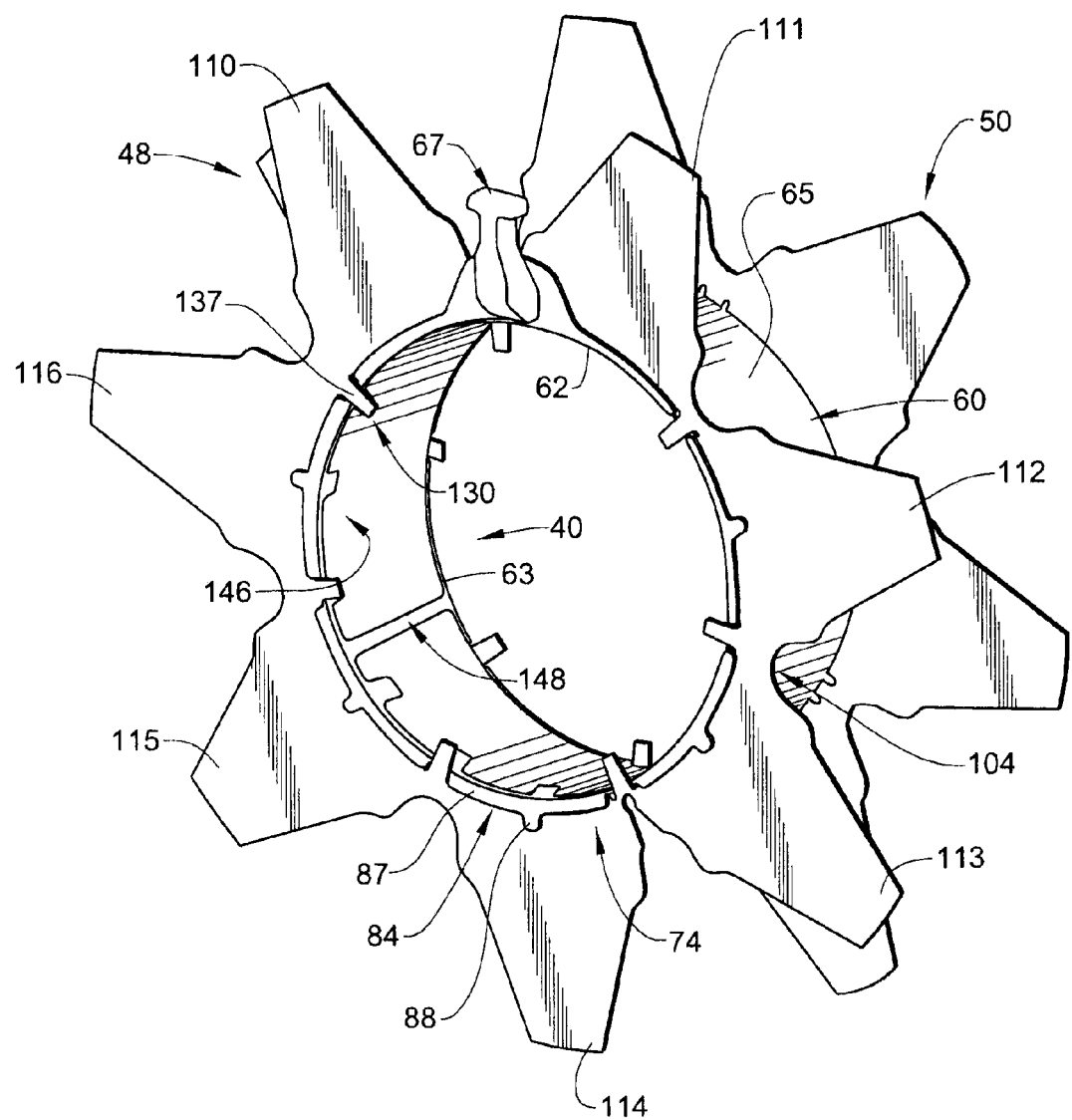
FIG. 6 is a right perspective view of the star member of FIG. 5 mounted to the spool of FIG. 4.

Reference will now be made to FIG. 6 in describing an exemplary construction of spool assembly 38. As shown, each star member 48 and 50 is mounted to corresponding ones of first and second end portions 62 and 63 of spool 40. Star member 48 is oriented such that each of the plurality of prongs 137 registers with a corresponding one of the second plurality of mounting elements 76. In this manner, each of the plurality of recesses 140 registers with a corresponding one of the first plurality of mounting elements 74. First plurality of mounting elements 74 prevent star member 48 from being moved in a direction away from second end portion 63, and second plurality of mounting elements 76 prevent star member 48 from moving in a direction toward second end portion 63.

More specifically, when star member 48 is properly positioned, each of the first plurality of mounting members 74 nests within a corresponding recess 140. With this construction, ear elements 87 and tab elements 80 not only contribute to establishing a desired orientation but also prevent any axial/rotational movement of star member 48 relative to a central axis (not separately labeled) of spool 40. Similarly, star member 50 is secured to spool 40 by third pluralities of mounting elements 80 and a fourth plurality of mounting elements 82.

Once star members 48 and 50 are properly positioned, prongs 137 on star member 50 are folded over into an interior surface (not separately labeled) of spool 40. More specifically, a steel ring 146 is inserted into spool 40 folding and locking prongs 137 to slots 93. Prongs 137 prevent rotation of star member 48 relative to spool 40. Steel ring 146 includes a split 148 that ensures a tight engagement with spool 40. After star members 48 and 50 are locked in position, spool 40 is wrapped with wire. After wrapping with wire, spool assembly 38 is inserted onto a rotor segment core (not separately labeled). Segment fingers (not shown) on the segment core cause flaps 110-116 on each star member 48 and 50 to fold over. The segment fingers also cause prongs 137 on star member 48 to fold over into corresponding slots (not separately labeled) formed in steel ring 146 to complete spool assembly 38 such as shown in FIG. 3.

At this point it should be understood that the above exemplary embodiments provide a spool assembly and components of a spool assembly having an enhanced wire carrying capacity while simultaneously eliminating the need for costly and difficult welding operations. That is, by eliminating the large, thick flanges required on prior art spools, the spool, in accordance with the exemplary embodiment, holds a larger volume of wire without increasing in size.

In general, this written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of exemplary embodiments of the present invention if they have structural elements that do not differ from the literal language of the claims, or if they include equivalent structural elements with insubstantial differences from the literal language of the claims.

The invention claimed is:

1. An electric machine comprising:
   a housing;
   a stator mounted within the housing; and
   a rotor rotatably mounted relative to the stator, the rotor including a spool assembly, the spool assembly including:
      a spool including a main body portion including a first end portion that extends substantially uninterrupted to a second end portion through an intermediate portion, the spool including a first plurality of mounting elements provided on the first end portion and a second plurality mounting elements provided on the first end portion; and
      a star member secured to the first end portion of the spool, the star member including a main body having a central opening and a plurality of mounting members that extend radially into the central opening, the plurality of mounting members constraining axial movement of the star member relative to the spool in a first direction and the first plurality of mounting elements constraining axial movement of the star member relative to the spool in a second direction.

2. The electric machine according to claim 1, wherein the star member includes a plurality of flap members that radiate outward from the central opening.

3. The electric machine according to claim 2, wherein the first plurality of mounting elements comprise a plurality of projections extending radially outward from the one of the first and second end portions.

4. The electric machine according to claim 3, wherein each of the plurality of projections include an ear element and a tab element.

5. The electric machine according to claim 3, wherein the second plurality of mounting elements comprises slots formed in the first end portion of the spool.

6. The electric machine according to claim 1, wherein the star member includes a plurality of mounting components, each of the plurality of mounting components being arranged adjacent respective ones of the plurality of mounting members.

7. The electric machine according to claim 1, wherein the spool is formed from plastic.

8. The electric machine according to claim 7, wherein the star member is formed from at least one sheet of non-conducting material.

9. The electric machine according to claim 7, wherein the star member is formed from a non-conducting material laminate.

10. The electric machine according to claim 1, further comprising: a steel ring positioned on an inner surface of the spool.

11. The electric machine according to claim 1 further comprising: a third plurality of mounting elements provided on the second end portion and a fourth plurality of mounting elements provided on the second end portion, the third plurality of mounting elements being distinct from the fourth plurality of mounting elements, and another second star member secured to the second end portion of the spool.

12. The electric machine according to claim 1 wherein the first plurality of mounting elements constrain axial movement of the star member in a direction away from the second end portion.

13. The electric machine according to claim 12 wherein the second plurality of mounting elements constrain axial movement of the star member in a direction toward the second end portion.

14. The electric machine according to claim 1 wherein the second plurality of mounting elements prevent rotation of the star member relative to a central axis of the spool assembly.

15. A spool for an electric machine, the spool comprising:
a main body portion including a first end portion that extends substantially uninterrupted to a second end portion through an intermediate portion, the main body being devoid of annular flanges at the first and second end portions; and
a plurality of mounting elements provided on the first end portion, the plurality of mounting elements includes first plurality of mounting elements and a second plurality of mounting elements, the first plurality of mounting elements being distinct from the second plurality of mounting elements, wherein the first plurality of mounting elements comprise a plurality of projections extending radially outward from the first end portion.

16. The spool according to claim 15, wherein the second plurality of mounting elements comprise slots formed in one of the first and second end portions of the spool.

17. The spool according to claim 15, wherein each of the plurality of projections include an ear element and a tab element.

18. The spool according to claim 15, wherein the plurality of mounting elements includes a third plurality of mounting elements and a fourth plurality of mounting elements, the third plurality of mounting elements being distinct from the fourth plurality of mounting elements, each of the third and fourth pluralities of mounting elements being arranged on the second end portion.

19. The spool according to claim 15, further comprising: a star member including a plurality of flap members that collectively define a central opening, and a plurality of mounting members that extend into the central opening, the plurality of mounting members being adapted to engage with corresponding ones of a plurality of mounting elements provided on a spool to form a spool assembly.

20. An electric machine comprising:
a housing;
a stator mounted within the housing; and
a rotor rotatably mounted relative to the stator, the rotor including a spool assembly, the spool assembly including:
a spool including a main body portion including a first end portion that extends substantially uninterrupted to a second end portion through an intermediate portion, the spool including a first plurality of mounting elements that extend radially outward from the main body portion at the first end portion and a second plurality mounting elements provided on the first end portion, the spool being devoid of annular flanges at the first and second end portions; and
a star member secured to the first end portion of the spool.

* * * * *